United States Patent [19]
Bolich et al.

[11] Patent Number: 5,787,677
[45] Date of Patent: Aug. 4, 1998

[54] GARAGE DOOR INSULATION SYSTEM

[75] Inventors: Richard M. Bolich, Toledo; Richard D. Godfrey; Frederick H. Ponn, III, both of Granville; Kevin P. Gallagher, Pataskala, all of Ohio; Louis T. Hahn, Alma, Mich.

[73] Assignee: Owens Corning Fiberglas Technology, Inc., Summit, Ill.

[21] Appl. No.: 544,523

[22] Filed: Oct. 18, 1995

[51] Int. Cl.$^6$ .............................. E04B 1/74; E04C 2/292; E04C 2/296
[52] U.S. Cl. .................... 52/784.15; 52/789.1; 181/294; 428/141
[58] Field of Search .................. 428/291, 251, 428/261, 282, 285, 301, 302; 52/784.15, 784.14, 783.12, 783.13, 789.1, 316, 314, 309.8, 309.9, 309.14, 784.11, 794.1; 160/232, 228, 229.1, 40; 181/284, 286, 290, 294

[56] References Cited

U.S. PATENT DOCUMENTS

| | | |
|---|---|---|
| 2,433,847 | 1/1948 | Jennings et al. . |
| 2,556,884 | 6/1951 | Muller ........................ 52/789.1 X |
| 2,760,881 | 8/1956 | Toulmin, Jr. . |
| 2,880,471 | 4/1959 | Munchhausen ........................ 20/4 |
| 3,092,203 | 6/1963 | Slayter et al. . |
| 3,273,297 | 9/1966 | Wehe, Jr. . |
| 3,276,928 | 10/1966 | Pearson et al. . |
| 3,506,088 | 4/1970 | Sherman ........................ 160/40 X |
| 3,511,301 | 5/1970 | Graham et al. ............. 160/232 X |
| 3,652,360 | 3/1972 | Hartman et al. ............ 181/290 |
| 3,658,633 | 4/1972 | Jumentier et al. . |
| 3,775,240 | 11/1973 | Harvey ........................ 52/309.17 |
| 3,922,425 | 11/1975 | Plumberg . |
| 4,004,049 | 1/1977 | Horwat et al. . |
| 4,206,267 | 6/1980 | Jungbluth ..................... 52/309.8 X |
| 4,236,365 | 12/1980 | Wheeler ........................ 52/784.1 |
| 4,273,685 | 6/1981 | Marzocchi . |
| 4,287,263 | 9/1981 | Woodring et al. . |
| 4,294,055 | 10/1981 | Andresen ........................ 52/784.1 |
| 4,333,866 | 6/1982 | Uffner . |
| 4,379,480 | 4/1983 | Kempel et al. ............ 52/784.15 X |
| 4,381,200 | 4/1983 | Bolen et al. ................ 428/291 X |
| 4,420,524 | 12/1983 | Gorgati ........................ 428/291 X |
| 4,457,983 | 7/1984 | Maile et al. . |
| 4,503,107 | 3/1985 | Cogliano . |
| 4,594,278 | 6/1986 | Nixon . |
| 4,811,538 | 3/1989 | Lehnery et al. ........... 52/784.11 |
| 4,828,004 | 5/1989 | Martinez et al. ........... 160/229.1 |
| 4,854,365 | 8/1989 | Juneau ........................ 160/232 |
| 4,911,975 | 3/1990 | Schult . |
| 5,100,715 | 3/1992 | Zimmerman et al. ....... 428/291 X |
| 5,435,108 | 7/1995 | Overholt et al. ............ 52/309.9 X |
| 5,665,447 | 9/1997 | Greaves et al. ............ 181/294 |

OTHER PUBLICATIONS

Clopay 1000 Steel Insulated Raised Panel Garage Door.

*Primary Examiner*—Michael Safavi
*Attorney, Agent, or Firm*—C. Michael Gegenheimer; Curtis B. Brueske

[57] ABSTRACT

A garage door insulation system includes a garage door having a major surface, an insulation layer of mineral fiber insulating material having a major surface, and an asphalt layer positioned between the major surfaces of the garage door and the insulation layer. The asphalt layer provides sound damping for the garage door. Preferably the asphalt layer acts as an adhesive to bond the insulation layer to the garage door. In a preferred embodiment, the major surface of the garage door is contoured, and the asphalt layer and insulation layer are deformable to the contour of the garage door.

15 Claims, 4 Drawing Sheets

5,787,677

GARAGE DOOR INSULATION SYSTEM

TECHNICAL FIELD

This invention relates in general to insulation products, and more specifically to an insulation product particularly suited for use in a garage door.

BACKGROUND ART

A garage for a vehicle includes a garage door for entrance and exit of the vehicle. The garage door is a large rectangular door which usually includes an upper panel, a lower panel, and two center panels. The panels are connected to one another by hinges. The garage door can be opened by sliding it upward on a pair of rails extending along the opening and ceiling of the garage.

Typically the garage door is opened by use of an automatic garage door opener. The automatic garage door opener makes opening and closing the garage door much easier and more convenient. However, a disadvantage of an automatic garage door opener is that it produces a large amount of vibration during use. A garage door is often formed from a metallic material such as steel. When the garage door is opened, the vibrations from the garage door opener are transmitted to the metallic garage door. As a result, the garage door resonates, producing a large amount of undesirable sound.

A garage door is often provided with insulating material to provide thermal insulation and to attempt to dampen the sound. One type of conventional insulation for garage doors is plastic foam insulation. The insulation is secured to the interior of each door panel. The surface of a door panel is often contoured to produce an attractive design. Unfortunately, the plastic foam insulation is formed in relatively rigid sheets that are not adapted for the contours of a door panel. The insulation lies on top of the contours instead of adjacent to the surface of the door panel, and as a result it does not provide adequate sound damping.

One way to address this problem is to mold the plastic foam insulation to include recesses adapted to receive the contours of the door panel. Unfortunately, the molding process adds an extra step to the manufacture of the insulation so that it is more expensive to produce.

The plastic foam insulation is usually secured to the interior of each door panel with hot melt adhesive. The hot melt adhesive is very expensive, so the minimum required amount of adhesive is used to secure the insulation to the door panel. The adhesive does not fully cover the surface area of the door panel, and again the insulation does not provide adequate sound damping. Another problem is that the adhesive can soften at hot temperatures or become brittle at cold temperatures, so that the insulation becomes loose from the door panel.

In addition to damping the sound of the garage door, it would be desirable for a garage door insulation to absorb sound from the interior of the garage to make it quieter. Unfortunately, plastic foam insulation is not a good sound absorber because it has a closed cell structure. Still another problem with plastic foam insulation is that it is susceptible to damage from accidental impact during and after installation of the garage door.

Thus, it would be desirable to provide a garage door insulation system which overcomes the shortcomings of the conventional insulated garage door.

DISCLOSURE OF THE INVENTION

This invention relates to a garage door insulation system. The insulation system includes a garage door having a major surface, an insulation layer of mineral fiber insulating material having a major surface, and an asphalt layer positioned between the major surfaces of the garage door and the insulation layer. The asphalt layer provides sound damping for the garage door. Preferably the asphalt layer acts as an adhesive to bond the insulation layer to the garage door. Also preferably, the major surface of the garage door is contoured, and the asphalt layer and insulation layer are deformable to the contour of the garage door. The garage door insulation system preferably includes a mineral fiber mat positioned adjacent to the insulation layer, and then a facing material on its exterior surface.

The garage door insulation system of this invention provides a garage door with excellent sound damping properties, even when the surface of the door panel is contoured. The asphalt layer and insulation layer can deform to the contour of the door panel and thereby fully cover its surface area with asphalt for effective sound damping. As a result, the garage door desirably sounds more like wood than metal. Additionally, the garage door insulation is effective in absorbing sound from the interior of the garage to make it quieter. It also provides good thermal insulation. The asphalt layer effectively adheres the insulation layer to the garage door even in extreme temperatures. The flammability rating of the garage door insulation is superior to conventional products. Surface durability is greatly improved; the surface of the garage door insulation compresses upon impact instead of sustaining damage. Importantly, the garage door insulation system reduces production costs and inventory costs so that the garage door can be sold more competitively.

Various objects and advantages of this invention will become apparent to those skilled in the art from the following detailed description of the preferred embodiment, when read in light of the accompanying drawings.

BEST MODE FOR CARRYING OUT THE INVENTION

Figure 1:
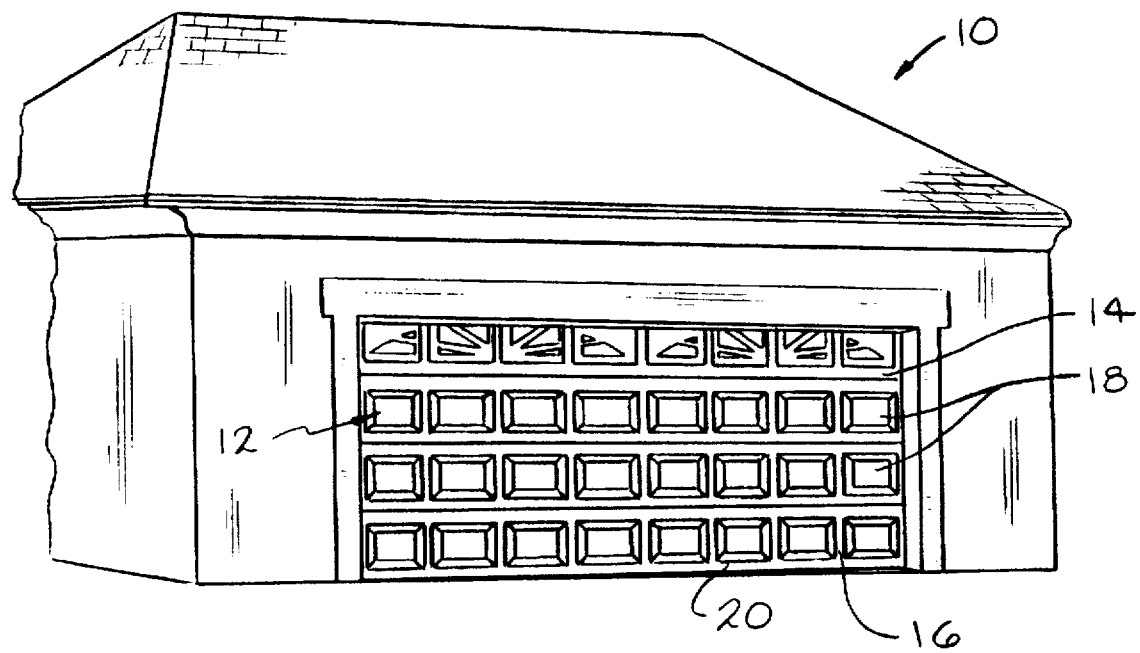
FIG. 1 is a perspective view of a conventional garage including a garage door.

Referring now to the drawings, there is illustrated in FIG. 1 a conventional garage indicated generally at 10. The garage 10 includes a large, rectangular garage door 12. The garage door 12 includes an upper panel 14, a lower panel 16, and two center panels 18. The panels are connected to one another by hinges (not shown). Contours 20 are formed in the panels to produce an attractive design. The panels are preferably formed from a metallic material such as steel, but they can also be formed from plastics, composites, or other suitable materials.

Figure 2:
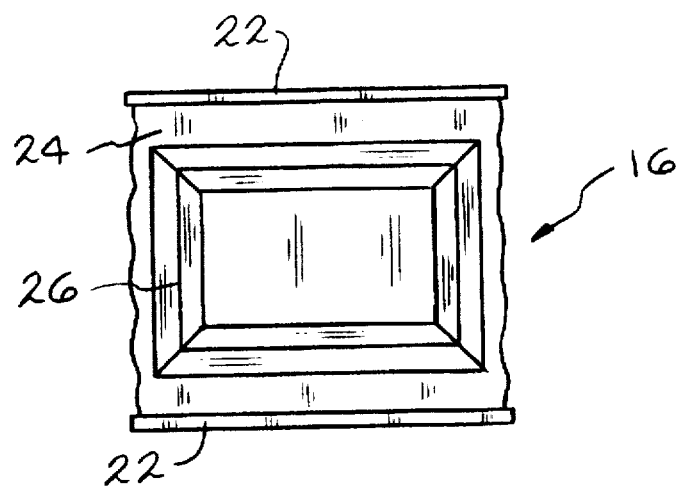
FIG. 2 is a rear view of a portion of the lower panel of the garage door.

While the following description will refer to the lower panel 16, it is recognized that this invention applies equally to any of the panels of the garage door 12. FIG. 2 shows a rear view of a portion of the lower panel 16. The lower panel 16 includes a frame 22 along its upper and lower edges. The lower panel 16 further includes a door tray 24 inside the frame 22 which defines a major surface. The door tray 24 is recessed from the frame 22 and it is generally flat, with the exception that a contour 26 is formed in the door tray 24. The contour 26 forms raised areas in the door tray 24.

Figure 3:
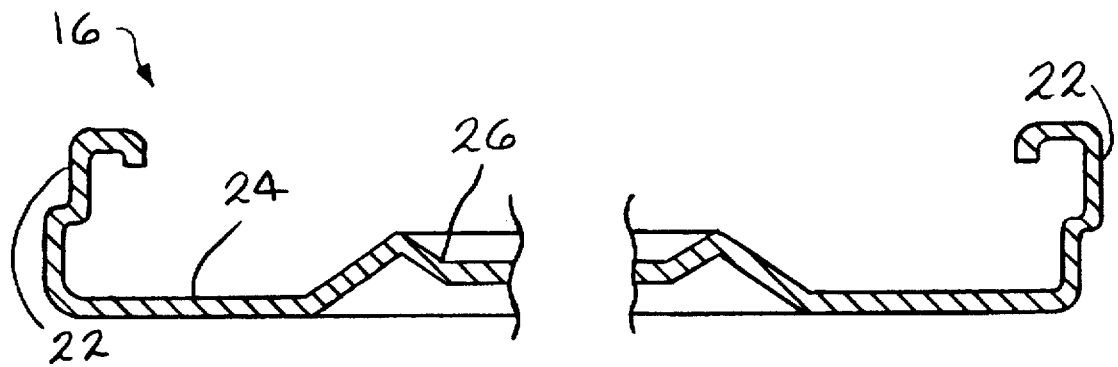
FIG. 3 is a cross-sectional view of the portion of the lower panel of the garage door.

Referring now to FIG. 3, the lower panel 16 is shown in cross section. Again, it can be seen that the lower panel 16 includes a frame 22 and a door tray 24. A raised contour 26 is formed in the door tray 24.

Figure 4:
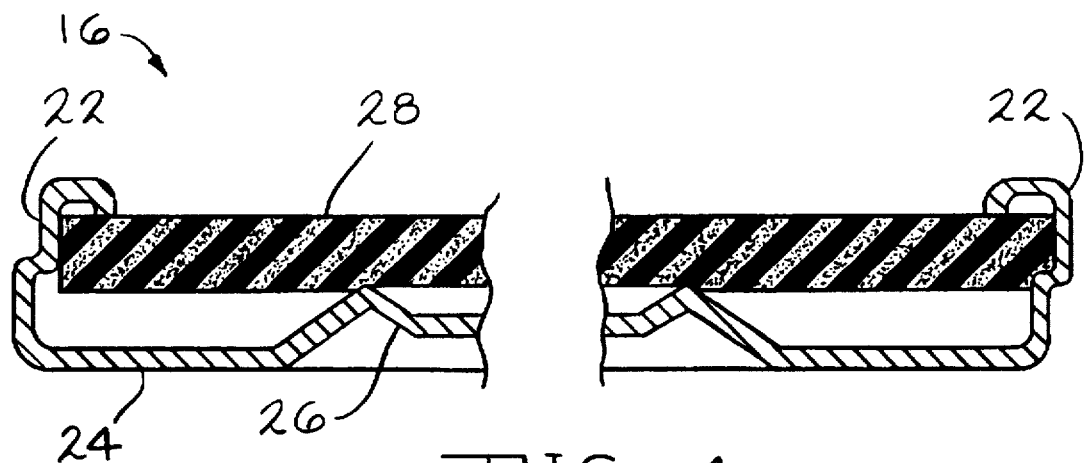
FIG. 4 is a cross-sectional view as in FIG. 3, and additionally showing a prior art plastic foam insulation positioned in the lower panel.

FIG. 4 illustrates the plastic foam insulation 28 of the prior art. It can be seen that the plastic foam insulation 28 is formed in a relatively rigid sheet that is not adapted to the contour 26 of the door tray 24. As a result, the plastic foam insulation 28 lies on top of the contour 26 instead of lying adjacent to the door tray 24. The plastic foam insulation 28 does not provide adequate sound damping to the lower panel 16.

Figure 5:
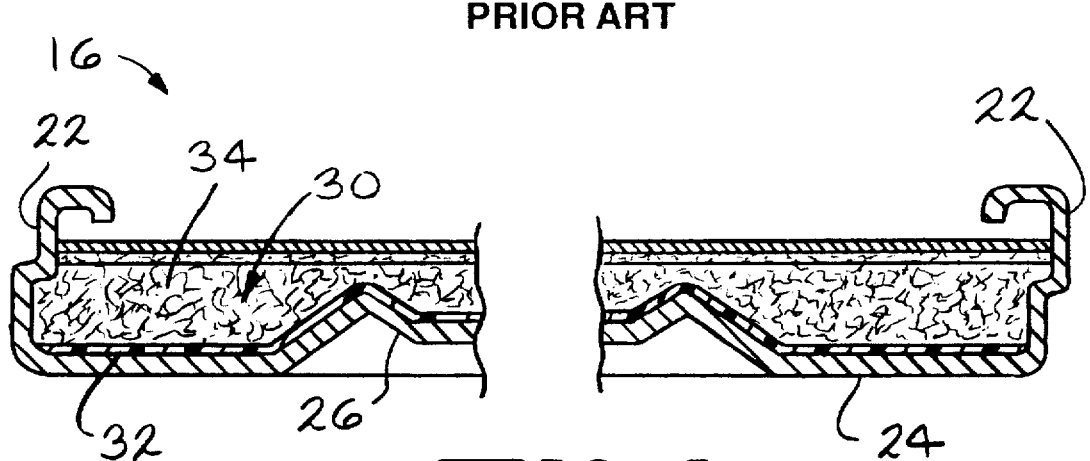
FIG. 5 is a cross-sectional view as in FIG. 3, and additionally showing a garage door insulation in accordance with this invention positioned in the lower panel.

FIG. 5 illustrates a garage door insulation 30 in accordance with this invention. The garage door insulation 30 includes an asphalt layer 32 and an insulation layer 34. The asphalt layer 32 is positioned adjacent to the door tray 24. It can be seen that the asphalt layer 32 and the insulation layer 34 are deformed to the contour 26 of the door tray 24. This allows the garage door insulation 30 to fully cover the surface area of the door tray 24. As a result, the garage door insulation 30 provides excellent sound damping to the lower panel 16. Additionally, the asphalt layer 32 provides excellent adhesion to secure the garage door insulation 30 to the door tray 24.

Figure 6:
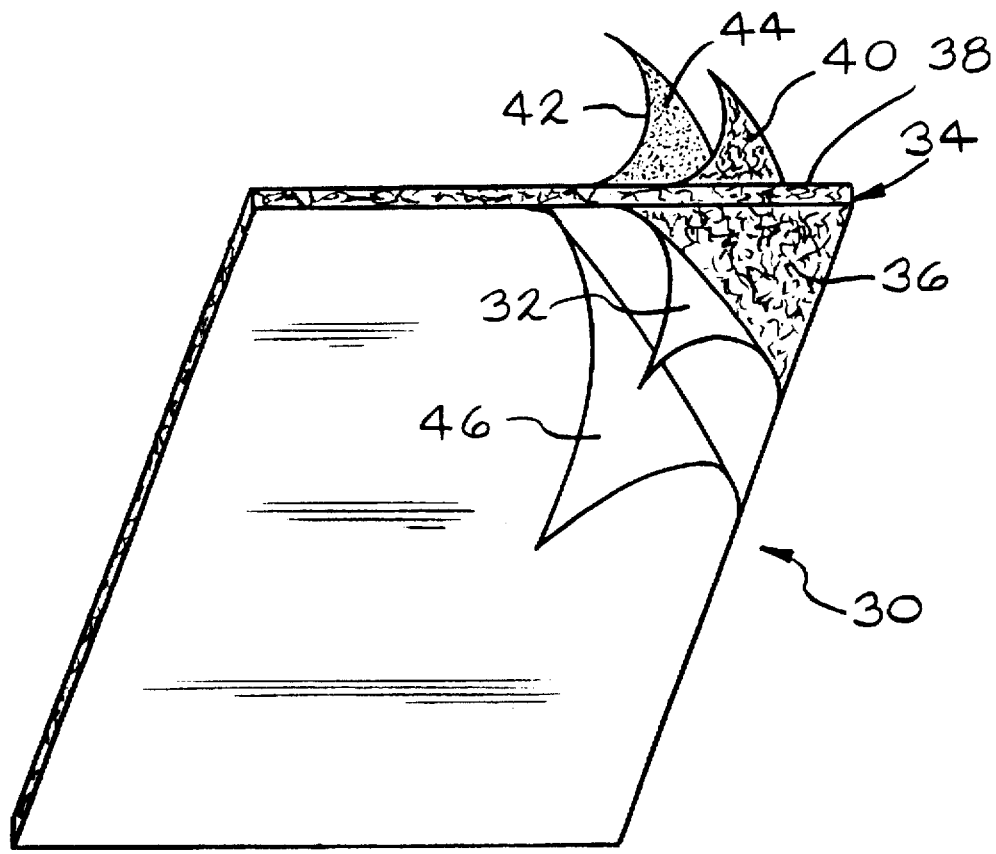
FIG. 6 is a perspective view of a piece of the garage door insulation.
Figure 7:
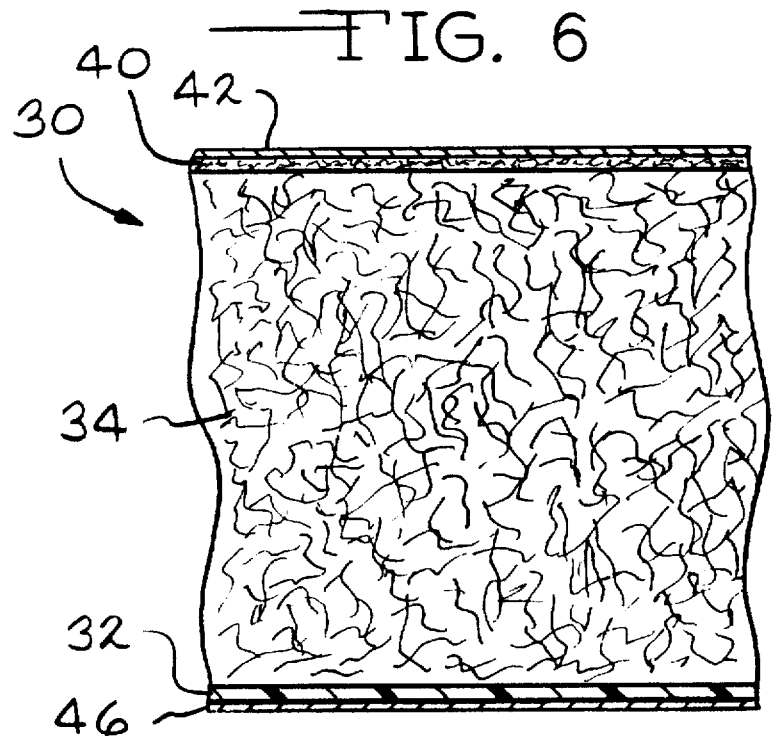
FIG. 7 is a cross-sectional view of the garage door insulation.

A preferred embodiment of a garage door insulation 30 in accordance with this invention is illustrated in FIGS. 6 and 7. It can be seen that the garage door insulation 30 is constructed of several layers of material. The major portion of the garage door insulation 30 is an insulation layer 34 of mineral fiber insulating material. The insulation layer 34 has a first major surface 36 and a second major surface 38. An asphalt layer 32 is positioned adjacent to the first major surface 36 of the insulation layer 34. The asphalt layer 32 acts as a sound damping material to provide the garage door insulation 30 with superior acoustical properties. The sound damping effect of the asphalt layer 32 can be determined by measuring the stiffness and loss factor of the asphalt layer on a Dynamic Mechanical Analyzer (DMA) or other suitable technique to characterize the rheology, and calculating the loss factor of this system by standard means. A system loss factor in excess of 0.05 at 100° F. (37.8° C.) and 100 Hz frequency is required to provide substantial sound damping.

To achieve the desired sound damping effect, preferably the asphalt layer 32 has a thickness of at least about 0.005 inch (0.013 cm), more preferably from about 0.005 inch (0.013 cm) to about 0.070 inch (0.178 cm), and most preferably about 0.010 inch (0.025 cm).

The asphalt used in the asphalt layer 32 can be any bituminous material such as tars, pitches or asphalts. The asphalt can be any natural or petroleum derived asphalt. The common source of asphalt is the residue or bottoms from the petroleum refining industry which includes those commonly referred to as paving grade, roofers flux, propane washed, and air-blown. A blend of asphalts can also be used.

The asphalt can be modified by the addition of a polymer or polymers to enhance its adhesive and vibration damping properties. Preferred polymers are ethylene copolymers such as Elva® 450 (ethylene vinyl acetate copolymer) or Elvaloy® AM (ethylene butylacrylate glycidylmethacrylate terpolymer) both made by Du Pont (Wilmington, Del.). The weight ratio of asphalt to ethylene copolymer is preferably between about 15:1 and about 35:1.

Another preferred polymer is a styrene/butadiene copolymer such as Kraton® 1101 (20% styrene, 75% butadiene) made by Shell Co., Houston, Tex. The weight ratio of asphalt to styrene/butadiene copolymer is preferably between about 6:1 and about 20:1.

Another preferred polymer is formed by copolymerization of SBS thermoplastic rubber and styrene monomer. This polymer is described in more detail in U.S. Pat. No. 4,273,685 to Marzocchi et al., issued Jun. 16, 1981, and U.S. Pat. No. 4,333,866 to Uffner, issued Jun. 8, 1982, both incorporated by reference herein.

Various inorganic or organic fillers can be incorporated into the asphalt layer 32 while maintaining the sound damping and adhesive properties of the asphalt layer. Preferably the filler is selected from calcium carbonate, mica, barium, reclaim rubber, and mixtures thereof. More preferably the filler is calcium carbonate because it is inexpensive and improves the damping performance of the asphalt layer 32. Additives such as fire retardants, tackifiers or oils can also be incorporated into the asphalt layer 32.

A modified asphalt found to be particularly effective for this invention includes an air-blown roofers flux asphalt with a softening point from about 200° F. (93° C.) to about 250° F. (121° C.) that is modified with from about 30% to about 60% calcium carbonate and from 0% to about 5% ethylene vinyl acetate copolymer such as Elvax® 450 made by Du Pont.

The asphalt layer 32 must provide sufficient adhesion to the garage door and be capable of maintaining adhesion with repeated opening and closing of the garage door in temperature extremes from about −20° F. (−29° C.) to about 140° F. (60° C.). As a measurement of this adhesion, a suitable asphalt layer 32 can maintain a bond between steel plates for at least 7 days at 140° F. (60° C.) with a constant load of 2.5 psi (0.176 kg/cm$^2$) applied. Preferably the asphalt layer including any polymers, fillers and additives has a softening point from about 250° F. (121° C.) to about 350° F. (177° C.).

Referring again to FIGS. 6 and 7, the insulation layer 34 has a thickness from about 0.25 inch (0.635 cm) to about 3 inches (7.62 cm), and more preferably from about 0.5 inch (1.27 cm) to about 1 inch (2.54 cm). The insulation layer 34 is positioned adjacent to the asphalt layer 32 and is preferably laminated (bonded) thereto. The asphalt layer 32 has adhesive properties such that the asphalt layer 32 and insulation layer 34 stay together as a unit during processing.

The mineral fiber insulating material for use as the insulation layer 34 of the garage door insulation 30 can be formed from fibers of minerals such as glass, rock, slag or basalt. Preferably the insulating material is formed from glass fibers, made by a rotary process. The glass fibers are usually impregnated with about 20% or less by weight of a binder, and typically between about 5% and about 10% by weight of a phenolic resin binder such as phenol-urea-formaldehyde. Then the glass fibers are molded and cured to the desired density to form the fiberglass insulating material. Preferably the fiberglass insulating material used in the insulation layer 34 has a relatively low density from about 0.75 pcf (pounds per cubic foot) (12 kg/m$^3$) to about 2.5 pcf (40 kg/m$^3$), more preferably from about 1.25 pcf (20 kg/m$^3$) to about 2 pcf (32 kg/m$^3$), and most preferably about 1.5 pcf (24 kg/m$^3$). The glass fibers in the insulating material preferably have an average diameter from about 3 to about 25 microns, and more preferably from about 3 to about 12 microns. Preferred fiberglass insulating material is commercially available from Owens-Corning Fiberglas Corporation, Toledo, Ohio.

As shown in FIGS. 6 and 7, the preferred garage door insulation 30 additionally includes a mineral fiber mat 40 positioned adjacent to the second major surface 38 of the insulation layer 34. The mineral fiber mat 40, preferably a glass fiber mat, is of the type well known for use as an interior web or carrier for asphalt in roofing shingles. The glass fiber mat is conventionally made from glass fibers held together by a binder comprising a thermoplastic and thermoset polymer system. It is manufactured on an industrial scale using conventional glass fiber mat processing techniques known to persons skilled in the art, or on a smaller scale using conventional handsheet casting techniques.

The mineral fiber mat preferably has a weight from about 1.6 lbs./100 ft.$^2$ (0.08 kg/m$^2$) to about 2.5 lbs./100 ft.$^2$ (0.12 kg/m$^2$). It comprises from about 68% to about 90% mineral fibers, preferably glass fibers, and from about 10% to about 32% binder, by weight of the mat. Preferably the mineral fiber mat comprises from about 73% to about 85% mineral fibers and from about 15% to about 27% binder. The binder for the mineral fiber mat preferably comprises about 90% urea formaldehyde resin and about 10% latex. LOI ("Loss On Ignition") is used to measure the weight percent of binder in the mineral fiber mat. It is determined by burning off all the binder from the mineral fibers and then measuring the weight loss, where LOI is calculated as [(Initial Weight —Final Weight) / Initial Weight].

Any conventional process can be used to make the glass fibers for a glass fiber mat, such as the rotary process or the continuous process which have been described above. The glass fibers preferably have an average length from about 3 mm to about 130 mm, more preferably from about 3 mm to about 25 mm. They preferably have an average diameter from about 7 microns to about 25 microns, more preferably from about 8 microns to about 20 microns.

Referring again to FIGS. 6 and 7, the preferred garage door insulation 30 additionally includes a facing layer 42 adhered to the mineral fiber mat 40. The facing layer 42 is preferably formed from a material selected from vinyl, polyolephin, nylon and polyester, and more preferably from vinyl. The facing layer 42 allows cleaning of the interior surface of the garage door insulation 30. Preferably the facing layer 42 is colored white to enhance the aesthetic properties of the garage door insulation 30.

The facing layer 42 is adhered to the mineral fiber mat 40 by any suitable means. Preferably the facing layer 42 is adhered to the mineral fiber mat 40 by use of an adhesive 44. A preferred adhesive is a water soluble adhesive such as a latex adhesive. More preferably the adhesive includes flame retardant additives.

Lastly, the garage door insulation 30 includes a release material 46 applied to the asphalt layer 32. The release material 46 is removed when the garage door insulation 30 is positioned on a garage door.

The garage door insulation 30 is ready to install in a garage door 12, preferably a metallic garage door. First, the release material 46 is removed from the asphalt layer 32. Referring again to FIG. 5, the garage door insulation 30 is positioned inside the lower panel 16 (or other garage door panel). Specifically, the asphalt layer 32 of the garage door insulation 30 is positioned adjacent to the door tray 24 of the lower panel 16. No adhesive is required between the garage door insulation 30 and the door tray 24. The lower panel 16 with the garage door insulation 30 properly positioned is conveyed over a heating element (not shown). The temperature of the lower panel 16 is raised to above about 325° F. (163° C.). The asphalt layer 32 in contact with the door tray 24 softens and flows over the door tray 24. Preferably a sponge rubber roller (not shown) or similar apparatus presses the garage door insulation 30 against the door tray 24, enhancing the bond between the asphalt layer 32 and the door tray 24. The garage door insulation 30 deforms to the contour 26 of the door tray 24. The lower panel 16 is air cooled, and the garage door insulation 30 is secured to the lower panel.

Figure 8:
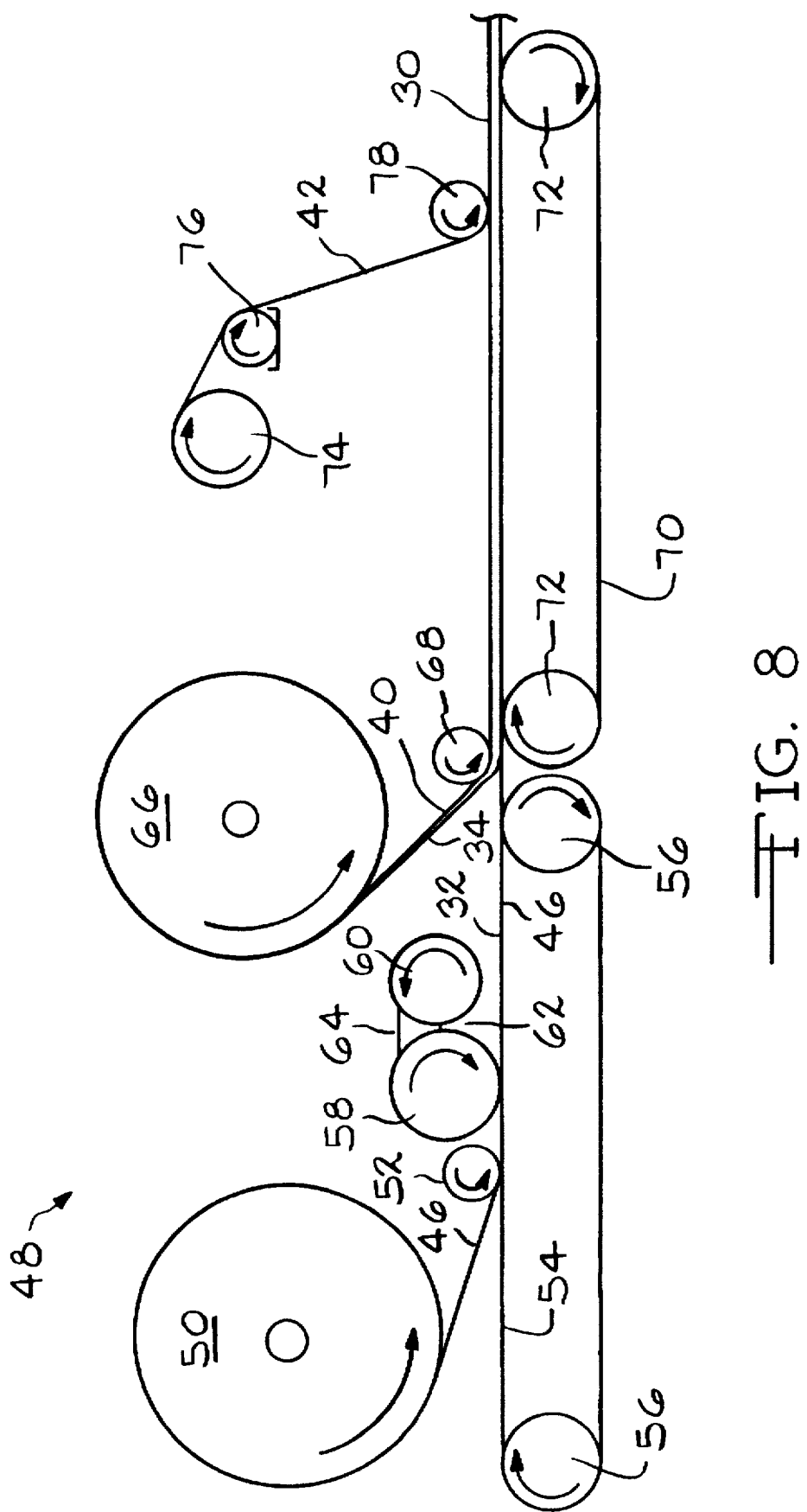
FIG. 8 is a schematic view of a method for manufacturing the garage door insulation.

FIG. 8 illustrates a roll coating method for manufacturing the garage door insulation 30 of this invention, by use of a roll coating apparatus indicated generally at 48. A release material 46 is fed from a first roll 50. The release material 46 is fed between a first pressure roller 52 and a first belt conveyor 54. The first belt conveyor 54 is driven by a pair of pulleys 56. The release material 46 is then fed between the first belt conveyor 54 and a coater applicator roller 58. A coater gap roller 60 is positioned adjacent to the coater applicator roller 58 with a gap 62 therebetween. The coater applicator roller 58 and coater gap roller 60 are heated, and are generally cylindrical in shape and lie generally parallel with one another. A supply of molten asphalt 64 is provided in a trough formed between the upper portions of the coater applicator roller 58 and the coater gap roller 60. The coater applicator roller 58 and the coater gap roller 60 rotate in opposite directions so that the molten asphalt 64 is drawn downward between the rollers. The coater applicator roller 58 has a larger diameter than the coater gap roller 60, so that the coater applicator roller lies adjacent to the release material 46 whereas the coater gap roller does not. As a result, molten asphalt 64 is carried downward on the surface of the coater applicator roller 58 and applied as an asphalt layer 32 onto the release material 46.

The viscosity of the molten asphalt 64 (including any filler or additive) as it is applied to release material 46 is maintained between about 1,000 cps and about 10,000 cps, preferably between about 1,500 cps and about 2,500 cps, and more preferably about 2,000 cps. The temperature and composition of the molten asphalt are adjusted to achieve this viscosity. Preferably the molten asphalt is maintained at a temperature between about 375° F. (191° C.) and about 450° F. (232° C.), more preferably between about 390° F. (199° C.) and about 425° F. (218° C.), and most preferably about 410° F. (210° C.).

An insulation layer 34 adhered to a mineral fiber mat 40 is fed from a second roll 66. The insulation layer 34 adheres to the asphalt layer 32 on the release material 46 as the layers are pulled past a second pressure roller 68. The layers are then carried by a second belt conveyor 70 driven by a pair of pulleys 72. A facing layer 42 is fed from a third roll 74 past an adhesive roll coater 76 which applies adhesive (not shown) to the facing layer. The facing layer 42 with adhesive is applied to the mineral fiber mat 40 as the layers are pulled past a third pressure roller 78. Thus, a garage door insulation 30 is formed in accordance with this invention.

Another suitable method for making a garage door insulation 30 is by an extrusion process, not shown.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, it is recognized that additional layers of material may be used in the garage door insulation along with those described above.

INDUSTRIAL APPLICABILITY

The invention can be useful for insulating garage doors for sound damping.

We claim:

1. A garage door insulation system comprising:
 a garage door having a major surface having a contour,
 an insulation layer of mineral fiber insulating material, said insulation layer being deformed to said contour and having first and second major surfaces, and
 an asphalt layer deformed to said contour and positioned between the major surface of the garage door and the first major surface of the insulation layer, wherein the asphalt layer provides sound damping.

2. The garage door insulation system defined in claim 1 wherein the asphalt layer provides a system loss factor in excess of 0.05 at 100° F. (37.8° C.) and 100 Hz frequency.

3. The garage door insulation system defined in claim 1 wherein the asphalt layer acts as an adhesive to bond the insulation layer to the garage door.

4. The garage door insulation system defined in claim 1 wherein the asphalt layer has a thickness from about 0.005 inch (0.013 cm) to about 0.070 inch (0.178 cm).

5. The garage door insulation system defined in claim 1 wherein the mineral fiber insulating material is fibrous glass wool having a density from about 0.75 pcf (12 kg/m³) to about 2.5 pcf (40 kg/m³) and wherein the insulation layer has a thickness from about 0.25 inch (0.635 cm) to about 3 inches (7.62 cm).

6. The garage door insulation system defined in claim 1 wherein the garage door insulation system additionally comprises:
 a mineral fiber mat having first and second major surfaces, the first major surface of the mineral fiber mat positioned adjacent to the second major surface of the insulation layer, and
 a facing layer having a major surface positioned adjacent to the second major surface of the mineral fiber mat.

7. A garage door insulation system comprising:
 a garage door having a major surface,
 an insulation layer of mineral fiber insulating material, said insulation layer having first and second major surfaces, and
 an asphalt layer positioned between the major surface of the garage door and the first major surface of the insulation layer, wherein the asphalt layer acts as an adhesive to adhere the insulation layer to the garage door, and wherein the asphalt layer provides sound damping.

8. The garage door insulation system defined in claim 7 wherein the asphalt layer includes asphalt modified with a polymer to enhance the adhesive properties of the asphalt.

9. The garage door insulation system defined in claim 7 wherein the asphalt layer provides a system loss factor in excess of 0.05 at 100° F. (37.8° C.) and 100 Hz frequency.

10. The garage door insulation system defined in claim 7 wherein the asphalt layer has a thickness from about 0.005 inch (0.013 cm) to about 0.070 inch (0.178 cm).

11. The garage door insulation system defined in claim 7 wherein the mineral fiber insulating material is fibrous glass wool having a density from about 0.75 pcf (12 kg/m³) to about 2.5 pcf (40 kg/m³) and wherein the insulation layer has a thickness from about 0.25 inch (0.635 cm) to about 3 inches (7.62 cm).

12. The garage door insulation system defined in claim 7 wherein the asphalt layer can maintain a bond between steel plates for at least 7 days at 140° F. (60° C.) with a constant load of 2.5 psi (0.176 kg/cm²) applied.

13. The garage door insulation system defined in claim 8 wherein the asphalt layer includes asphalt modified with a polymer selected from the group consisting of ethylene copolymers and styrene/butadiene copolymers.

14. The garage door insulation system defined in claim 7 wherein the asphalt layer has a softening point from about 250° F. (121° C.) to about 350° F. (177° C.) and maintains adhesive properties at temperatures from about −20° F. (−29° C.) to about 140° F. (60° C.).

15. The garage door insulation system defined in claim 7 wherein the garage door is metallic.

* * * * *

UNITED STATES PATENT AND TRADEMARK OFFICE
CERTIFICATE OF CORRECTION

PATENT NO. : 5,787,677

DATED : August 4, 1998

INVENTOR(S) : Bolich, et al.

It is certified that error appears in the above-identified patent and that said Letters Patent is hereby corrected as shown below:

Column 7, line 38 (claim 6, line 1), "defmed" should read -- defined --

Column 8, line 22 (claim 11, line 1), "defmed" should read -- defined --

Column 8, line 28 (claim 12, line 1), "defmed" should read -- defined --

Signed and Sealed this

Eighth Day of December, 1998

Attest:

BRUCE LEHMAN

*Attesting Officer*

*Commissioner of Patents and Trademarks*